United States Patent [19]
Miller

[11] 4,189,042
[45] Feb. 19, 1980

[54] CONSTANT TORQUE FRICTION CLUTCH
[75] Inventor: Donald L. Miller, Horseheads, N.Y.
[73] Assignee: Facet Enterprises, Inc., Tulsa, Okla.
[21] Appl. No.: 858,582
[22] Filed: Dec. 8, 1977
[51] Int. Cl.² .......................... F16D 7/02; F16D 27/10
[52] U.S. Cl. .................................... 192/84 C; 64/30 R
[58] Field of Search ............ 192/84 C; 64/30 R, 30 C

[56] References Cited
U.S. PATENT DOCUMENTS

| 1,632,539 | 6/1927 | Chilton | 64/30 C |
| 1,739,947 | 12/1929 | Chilton | 64/30 C X |
| 2,587,712 | 3/1952 | Dodge | 64/30 R X |
| 3,122,903 | 3/1964 | Ramsden | 64/30 C |
| 3,511,349 | 5/1970 | Herscovici | 64/30 C X |
| 3,902,334 | 9/1975 | Ryan | 64/30 C X |

FOREIGN PATENT DOCUMENTS 244129  8/1946  Switzerland ............................ 64/30 C

*Primary Examiner*—Allan D. Herrmann
*Attorney, Agent, or Firm*—Remy J. VanOphem

[57] ABSTRACT

A constant torque electromagnetically operated friction clutch including an axially moveable ferromagnetic armature drawn into frictional engagement with an inner body driving the output shaft upon energization of an electromagnetic coil.

The torque level transmitted is limited by an arrangement including an intermediate member which is rotatably connected to the armature by pins received at openings in the armature while allowing a predetermined extent of relative axial movement before heads on the pins abut the openings. The intermediate member is drivingly connected to the input member by camming balls which react to torque being transmitted, forcing the intermediate member to move axially, which movement is resisted by a spring force. When the intermediate member reaches the null extent of relative axial travel allowed by the pins, any increase in transmitted torque decreases the engagement pressure of the armature with the inner body set by the maximum torque at that level.

6 Claims, 2 Drawing Figures

CONSTANT TORQUE FRICTION CLUTCH

BACKGROUND OF THE INVENTION

1. Field of the Invention

This invention concerns clutches, and more particularly friction clutches which transmit constant torque levels.

2. Description of the Prior Art

In many clutch designs, the torque level transmissible through the clutch may vary, particularly in electromagnetically actuated clutches, due to such variable factors as line voltage, temperature, friction surface coefficient, duration of duty cycles, etc. These factors will vary the torque which may be developed from such pressure.

Such variations in torque levels can be troublesome in applications where the timing of the development of particular torque level is critical to proper performance of the unit.

While separate torque limiting devices could be used, this would significantly increase the cost of the unit.

Accordingly, it is an object of the present invention to provide such a clutch in which variations in operating conditions do not change the torque transmitted through the clutch.

It is another object of the present invention to provide such a constant torque level which may be set to a predictable level which can be reliably repeated.

It is still another object of the present invention to provide such a clutch without the need for a separate torque limiting assembly.

It is yet another object of the present invention to provide a simple and reliable arrangement for achieving such constant preset torque level transmissible through the clutch.

SUMMARY OF THE INVENTION

These and other objects, which will become apparent upon a reading of the following specification and claims, are accomplished by a friction clutch incorporating an intermediate member drivingly connected to the armature as to rotate together therewith while allowing relative axial movement against the bias of a spring force. The intermediate member and a rotatable input member are drivingly connected by camming balls and recesses which act to cause the intermediate member to be moved axially upon the transmission of torque through the clutch. The axial movement proceeds until an axial engagement is established between the intermediate member and the armature after a predetermined extent of travel of the intermediate member. Any tendency for increases in torque are nullified by the action of the intermediate member tending to decrease the engagement pressure of armature and the output clutch member to thus create a constant torque output which is constituted by the torque at the level of the spring force at the point the axial engagement between the intermediate member and the armature is established. The constant torque level is selected to be the minimum level required such that increases in engagement pressure due to line voltage variations, etc. do not result in increased torque output.

DETAILED DESCRIPTION

Figure 1:
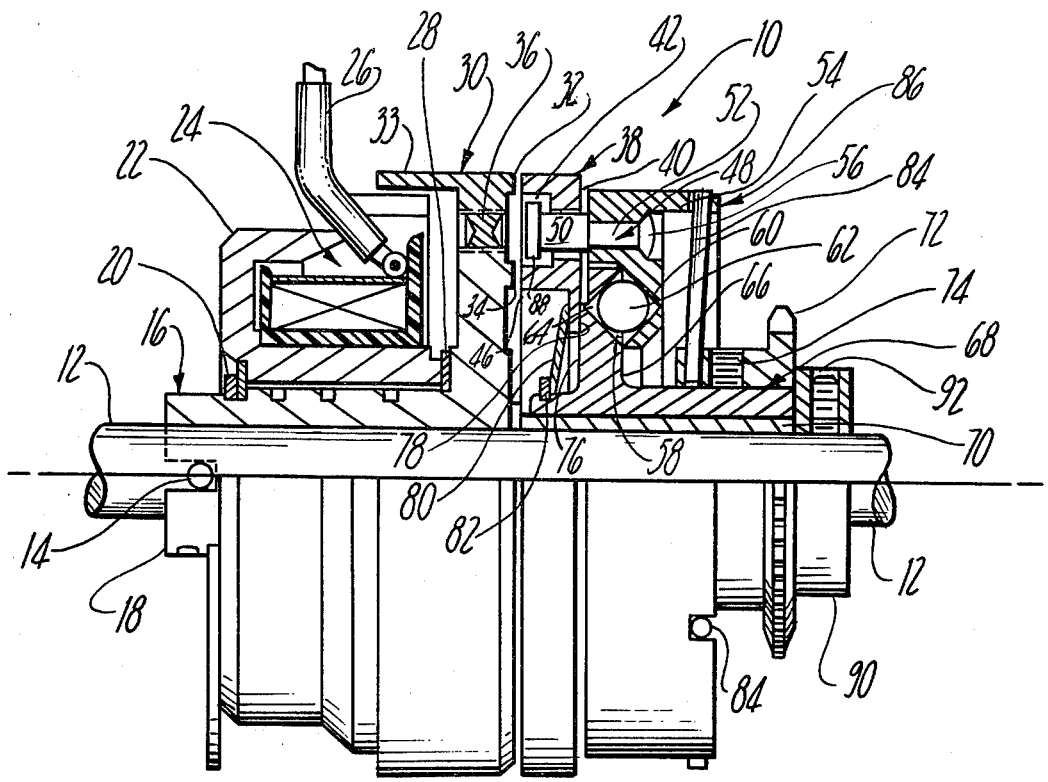
FIG. 1 is a partial section of a typical friction clutch incorporating the constant torque arrangement according to the present invention before engagement.
Figure 2:
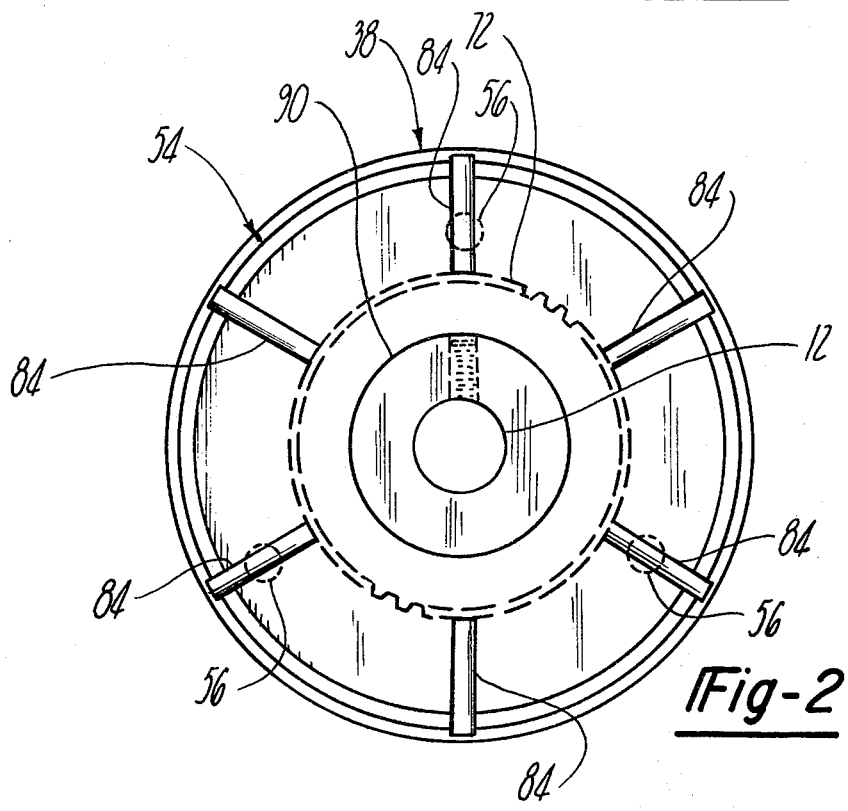
FIG. 2 is a partial section of a typical friction clutch incorporating the constant torque arrangement according to the present invention.

In the following specification and claims, certain specific terminology will be employed for the sake of clarity and a particular embodiment described in accordance with 35 U.S.C. 112 but it is to be understood that the same is not intended to be limiting, and should not be so construed inasmuch as the invention is capable of taking many forms and variations within the scope of the appended claims.

Referring to the drawings, a friction clutch 10 incorporating the constant torque feature according to the present invention is shown.

An output shaft 12 is pinned at 14 to an output member 16 and so as to rotate together. A hub portion 18 is axially located by means of snap retainers 20 to a stationary coil housing 22 which mounts clutch operators comprised of an electromagnetic coil 24, adapted to be energized via leads 26 by means of an external power supply and controls (not shown).

A thrust washer 28 serves to axially locate the front portion of the output member 16 and absorb the axial thrust exerted thereon during actuation of the clutch 10, the thrust washer 28 being located between a shoulder formed on a radially extending flange 30 integral with the output member 16.

The radially extending flange 30 is formed with an annular pole face 32, and with a second pole formed on an outer ferromagnetic ring 33 separated by a nonmagnetic separator ring 36 from the flange 30 so as to allow a magnetic flux path to be set up into an axially movable member comprised of an armature 38 upon energization of the electromagnetic coil 24. The outer ring 33, the separator ring 36 and the output member 16 are joined together to be an integral unit so as to rotate together.

The armature 38, mounted coaxially with the output shaft 12 and the output member 16 is formed with an outer rim 40 having a radial face 46 to be engaged with the pole faces 32 and 34 upon energization of the electromagnetic coil 24. The armature 38 is constructed of a ferromagnetic material such as steel for this purpose.

The axially movable armature 38 serves, together with the clutch operator, as a means for establishing a clutching relationship between the clutch input and output members.

An input hub member 68 is rotatably mounted on the output shaft 12 by means of a bearing 70 and has an input sprocket 72 mounted thereon affixed thereto by means of a set screw 74.

The armature 38 is positioned radially by a plurality of pins 48, preferably three, having a large diameter portion 50 passing into corresponding counterboard openings 42 in the armature 38. The smaller diameter portion 52 is fixed in bores in the intermediate member, here taking the form of an auxiliary armature ring 54 as by riveting the ends 56 as shown so as to rotatably connect the armature 38 and the auxiliary armature ring 54 while allowing limited relative axial and rotational movement therebetween.

Auxiliary armature ring 54 has an inner annular face 58 into which is formed a conical recess set comprised of three conical recesses 60 into each of which is disposed a ball 62, each ball 62 also seating in a corresponding set of recesses 64 formed in a radial face 66 of the coaxial input hub member 68. The ball-recess engagement provides a rotatable driving connection between the auxiliary armature ring 54 and the input hub 68, and thus also, between the input hub 68 and the armature 38 through the pins 48.

A radial face 76 opposite the face 66 of the input hub member 68 abuts an inner annulus 78 formed on the armature 38 to provide a fixed abutment for the armature 38 under the urging of a dished spring 80 engaging a snap ring 82 seated on the input hub member 68, biasing the armature 38 away from and out of engagement with the inner body 30.

The relative axial movement of the auxiliary armature ring 54 away from the radial face 66 of the input hub 68 and armature 38 is resisted by a plurality of equispaced spider spring elements 84 seated at one end in circumferentially spaced slots 86 formed thereon, and anchored at the other end in pockets formed in the sprocket 72, the pockets being fixed relative the intermediate member, i.e. the auxiliary armature ring 54, providing an axial reaction point.

Since the sprocket 72 is fixed to the input hub member 68, relative axial and rotational movement between the input hub member 68 and the auxiliary armature ring 54 is resisted by the spider springs 84, and an axial spring force is generated by their deflection. This spring force creates an axial reaction force transmitted into the hub member 68 via the balls 62 which increases with increasing relative axial movement between the auxiliary armature ring 54.

A limit to the relative axial travel of the armature 38 and the auxiliary armature ring 54 is provided by the headed portions 88 of the pins 48 abutting the counterbored 42 openings after a predetermined length of axial travel, preventing further relative axial movement between the auxiliary armature ring 54 and the armature 38. This point occurs at a predetermined level of torque being transmitted through the clutch 10.

The headed portions 88 limit the further relative axial travel between the auxiliary armature ring 54, armature 38, and any increase in torque levels transmitted through the balls 62 causes a camming action decreasing the engagement pressure of the armature 38 with the pole faces 32 and 34, thus limiting torque. At the same time, the spider springs 84 continue to resist relative axial travel such that the maximum level of torque is predetermined to be that existing at this level of torque, to thus accomplish the object of the invention.

The axial position of the sprocket 72, bearing 70, and input hub member 68 is fixed on the shaft 12 by means of a collar 90 and set screw 92.

Operation

In the deenergized condition, the imput member 68 is rotating while the output member 16 is stationary. Also, the magnetic body housing 22 is fixed. When the coil 24 is energized, the armature 38 is drawn into pole faces 32 and 34 of the output member 16. At this point of the operational condition, the headed portion 88 of rivet 50 does not come into contact with armature 38. Because of the relative axial rotational movement of the armature with respect to the pole faces during the energizing condition, the ball action driving engagement indirectly causes an axial movement between the auxiliary armature ring 54 and the input member 68. Since the input member is kept in constant engagement with the armature by the bias of spring 80, this axial movement of the auxiliary armature ring 54 is also with respect to the armature 38. axial movement of the auxiliary armature ring 54 is resisted by a plurality of equispaced spider ring elements 84. As the torque within the clutch builds up, the axial movement of the auxiliary armature ring 54 with respect to the armature continues to increase. This axial movement will continue until the headed portion 88 of rivet 50 bottoms out against the face of the counterbore in the armature. The bottoming out of the headed portion 88 of river 50 in the counterbored openings 42 after a predetermined length of axial travel signifies a predetermined level of torque being transmitted through the clutch. At this predetermined level of torque, the spider spring 84 reaction force is in balance with the axial force generated by the movement of the balls 62 in the recesses 64 and 66 as well as the force generated due to the electromagnetic effect of the magnet body housing. Therefore, at this predetermined level of torque, the axial forces of the electromagnetic coil, the ball recess drive connection and spider springs are in balance. If, for whatever reason, the additional torque is intended to be carried through the clutch, the ball action drive connection will generate additional axial movement of the auxiliary ring member 54 causing the headed portion 88 to decrease the engagement of the armature with the pole faces and lift the armature off the pole faces. The axial motion of this additional torque will also be resisted by the spider springs. Therefore, as soon as the additional torque over and above the predetermined limit is removed, the spider springs will again cause the auxiliary armature 54 to move the ball recess drive connection to its predetermined limit position and allow the armature to again engage the pole faces of the electromagnetic body housing. The level of torque, therefore, carried through the clutch is at all times constant through the action of the ball recess drive connection to build the torque up to the specified level or the interreaction of the auxiliary armature ring member and spider spring biasing member upon the armature through the headed portion 88 of rivet 50.

Upon deenergization of the coil 24, the return spring 80 will urge the armature 38 to its return position with face 78 against the face 76 of the input hub 68.

The torque level transmitted will correspond to the force created by the springs 84.

The engagement between the auxiliary armature ring 54 and the hub 68 constitutes a camming means which causes a relative axial movement between the armature 38 and the auxiliary armature ring 54, limited by the axial stop 88. This camming means causes a disengagement pressure to be exerted after the point at which the armature 38 and auxiliary armature ring 54 have come into axial engagement to create the constant torque output.

Any other equivalent camming means producing this driving relationship between the parts could be utilized.

It can be appreciated that this arrangement controls the torque transmitted so as to be constant regardless of whether the increase is due to an increase in engagement pressure, or to variations due to changes in frictional coefficients, etc.

Many variations are of course possible such as the alternate camming means mentioned but also other clutch operators, such as mechanical or hydraulic means, other mounting arrangements for the drive cup and armature, etc. are possible.

Of course, the above embodiments have made reference to "input" or "output" shafts or members for the sake of clarity; but it will be understood that rotative power may be transmitted through the clutch in either direction. Thus, a "first" clutch member and a "second" clutch member could be utilized to refer to these members broadly.

What is claimed is:

1. A constant torque friction clutch comprising:
   a rotatable first clutch member;
   a rotatable second clutch member;
   means for establishing a clutching engagement between said first and second clutching members, including an axially movable member mounted for relative axial movement with respect to said first and second clutch members;
   said means further including means rotatably connecting said first clutch member and said axially movable member;
   said means also including clutch operator means selectively producing clutching engagement between said axially movable member and said second clutch member, said clutch operator means including means causing said axially movable member and said second clutch member to be urged axially into frictional engagement;
   said means rotatably connecting said axially movable member and said first clutch member including an intermediate member and also including means connecting said intermediate member for rotation together with said axially movable member while allowing limited relative axial movement therebetween in a direction away from the direction of said axial engagement with said second clutch member before becoming axially engaged with each other;
   said means rotatably connecting said axially movable and said first clutch member further including camming means drivingly interengaging said intermediate member and said first clutch member producing said relative axial movement between said intermediate member and said axially movable member in said axial direction away from said axial direction of engagement in response to the transmission of torque through said clutch; and
   spring bias means creating a spring force resisting said relative axial movement between said axially movable member and said intermediate member, whereby an increase in torque beyond that corresponding to said limit of relative axial movement produces a disengaging force by the action of said camming means and said axial engagement between said axially movable member and said intermediate member to thereby set the maximum torque level at that corresponding to the force generated by said spring bias means.

2. The clutch according to claim 1 wherein said camming means comprises a camming ball-recess engagement between said intermediate member and said first clutch member.

3. The clutch according to claim 1 wherein said spring bias means creating said spring force comprises at least one spring element mounted to said intermediate member and an axially fixed reaction point.

4. The clutch according to claim 1 wherein said means connecting said intermediate member and said axially movable member comprises a plurality of drive pins extending into corresponding holes in said axially movable member.

5. The clutch according to claim 4, wherein each of said drive pins is formed with an enlarged head, and wherein said holes in said axially movable member engages a respective enlarged head after said predetermined extent of axial travel.

6. The clutch according to claim 1, wherein said clutch operator comprises an electromagnetic coil and wherein said axially movable member comprises a ferromagnetic armature whereby energization of said coil produces said axial movement of said armature into engagement with said second clutch member.

* * * * *

UNITED STATES PATENT AND TRADEMARK OFFICE
CERTIFICATE OF CORRECTION

PATENT NO. : 4,189,042
DATED : February 19, 1980
INVENTOR(S) : Donald Leroy Miller It is certified that error appears in the above-identified patent and that said Letters Patent are hereby corrected as shown below:

Column 4, line 6 Delete the word "axial" and insert therefore ----Axial----.

Column 4, line 14 Delete the word "river" and insert therefore ----rivet----.

Column 6, line 19 Delete the word "firct" and insert therefore ----first----.

Signed and Sealed this

Fifteenth Day of July 1980

[SEAL]

Attest:

SIDNEY A. DIAMOND

Attesting Officer

Commissioner of Patents and Trademarks